UNITED STATES PATENT OFFICE.

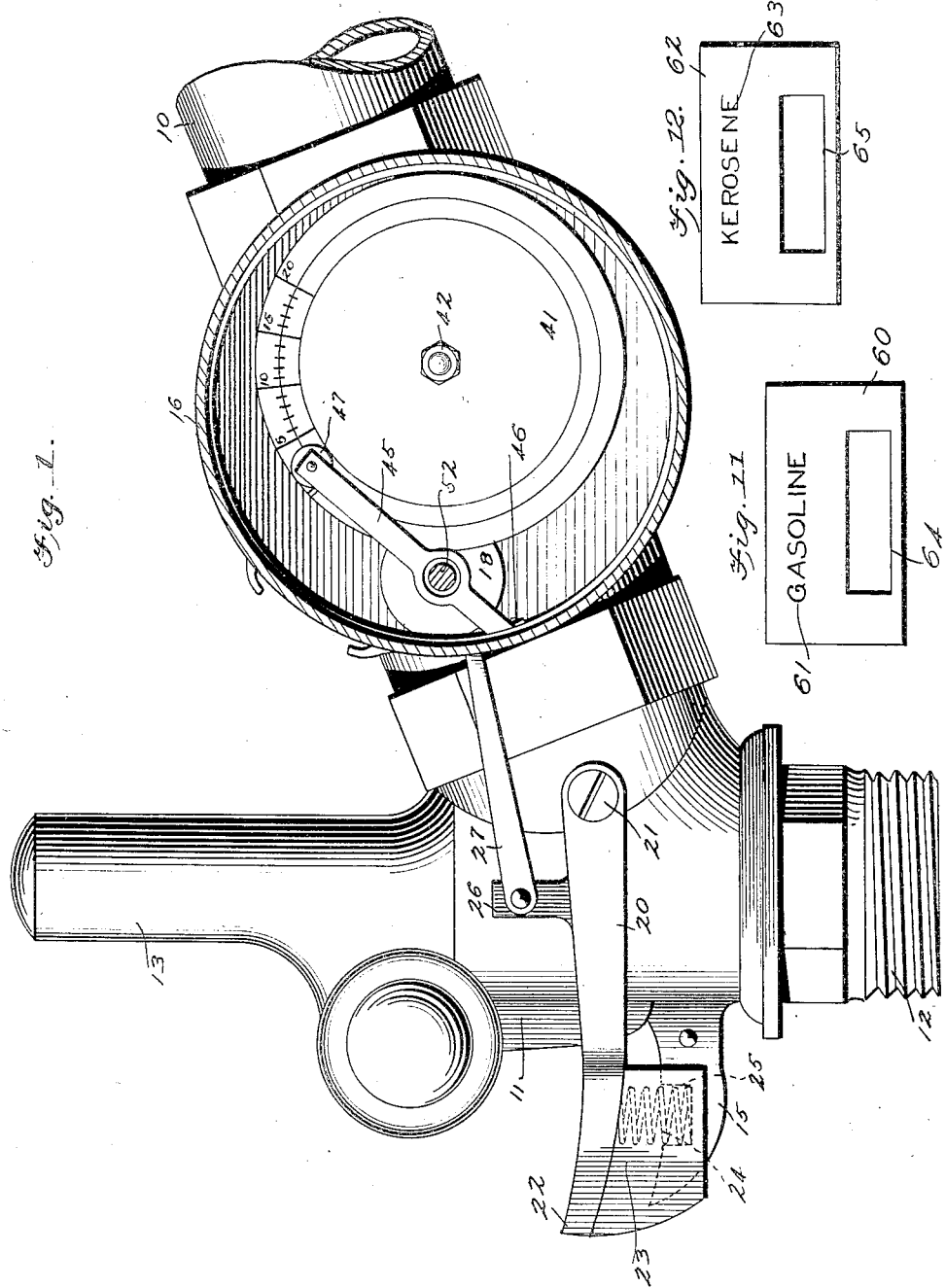

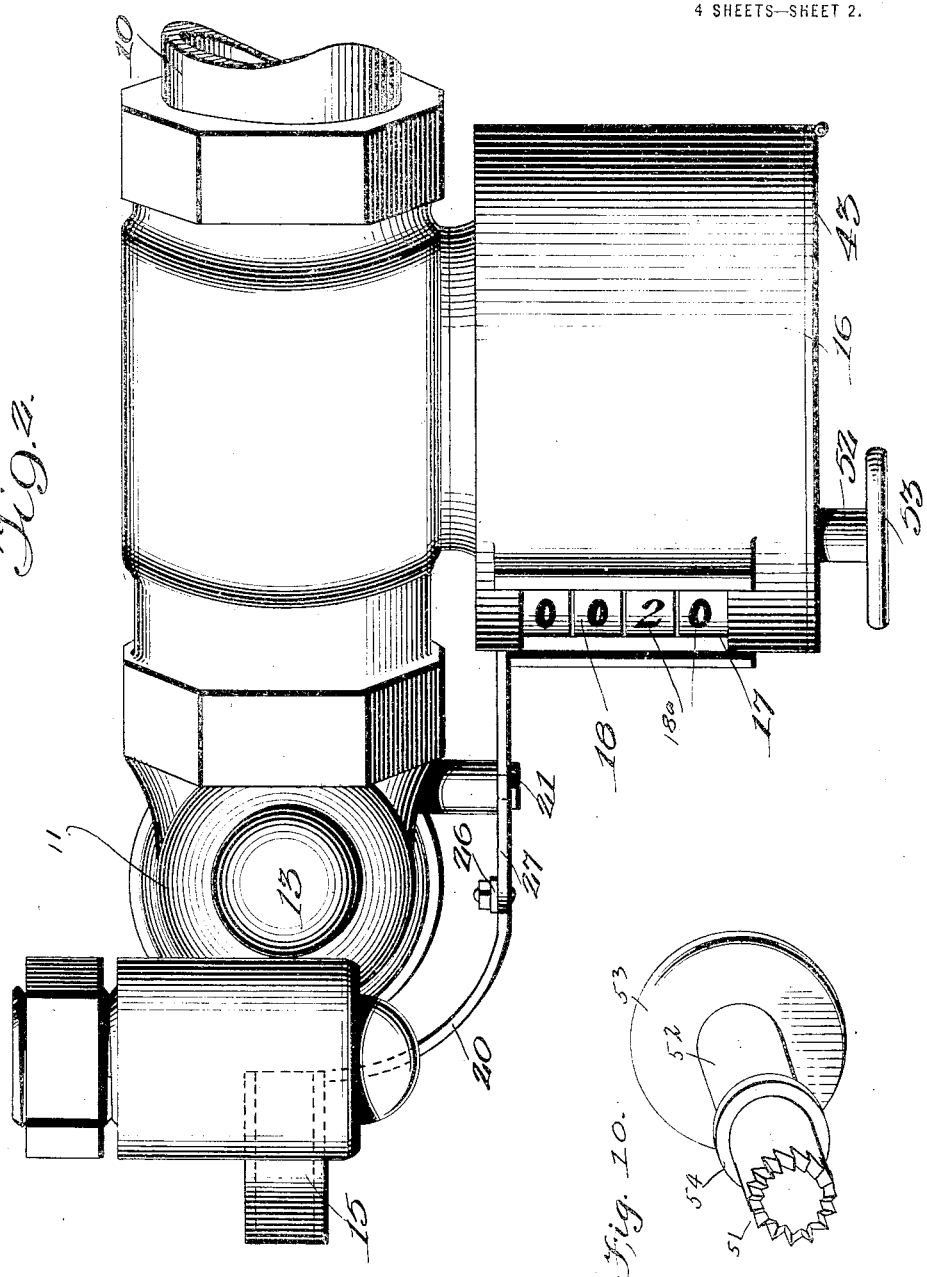

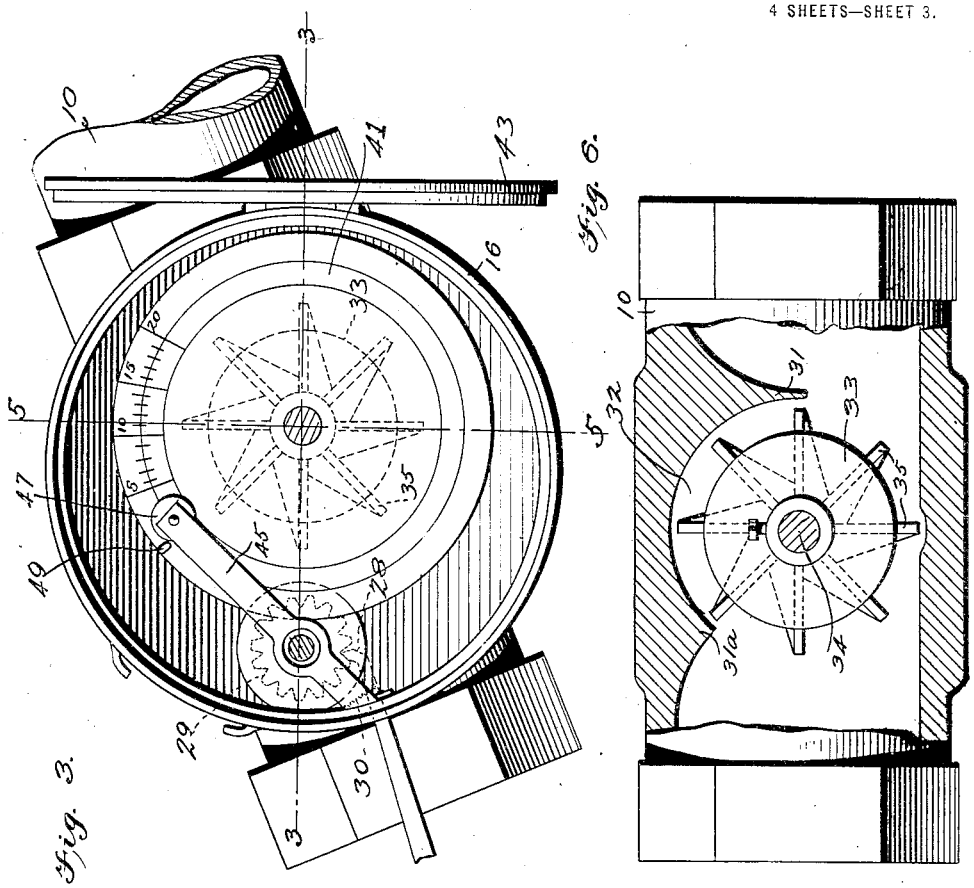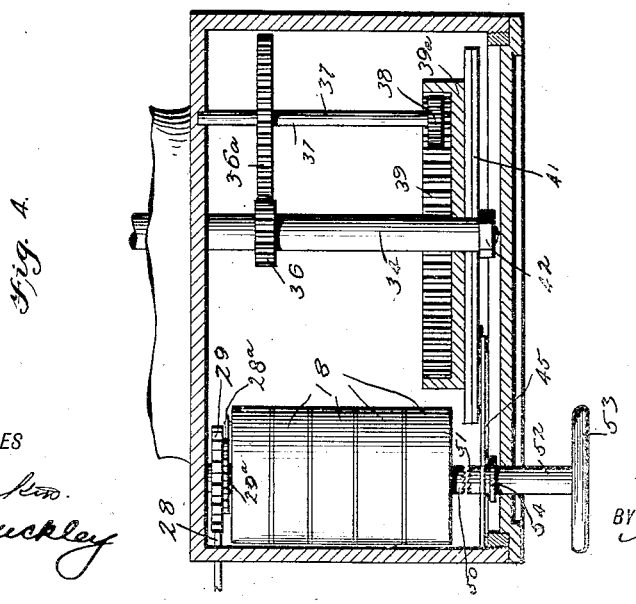

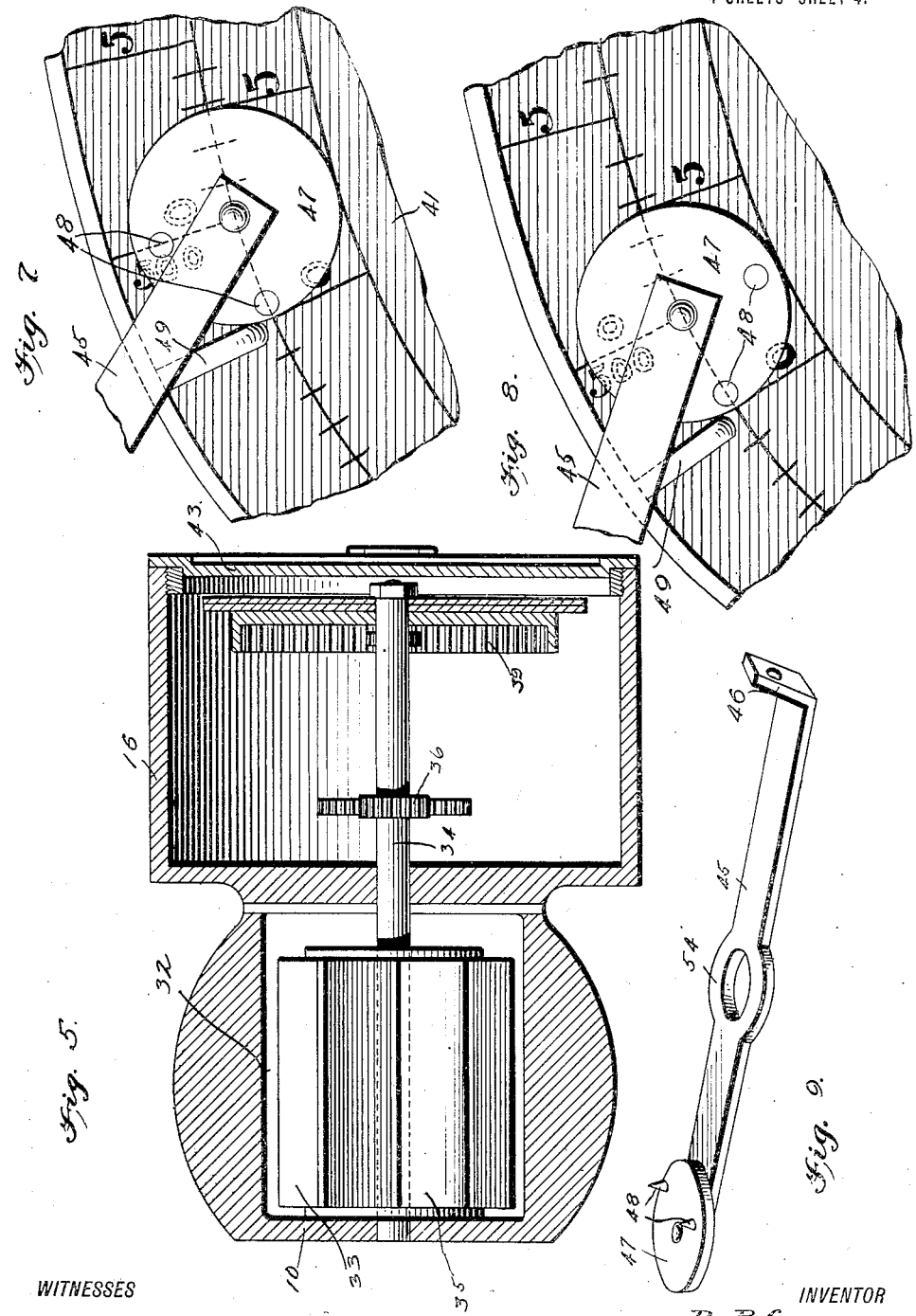

RALPH BLANCETT CORMANY AND ALBERT FRANKLIN HERRING, OF ROME, GEORGIA.

COMBINED RECORDER AND REGISTER.

1,397,502.  Specification of Letters Patent.  Patented Nov. 22, 1921.

Application filed November 17, 1920. Serial No. 424,618.

*To all whom it may concern:*

Be it known that we, RALPH BLANCETT CORMANY and ALBERT FRANKLIN HERRING, citizens of the United States, and residents of Rome, in the county of Floyd and State of Georgia, have invented certain new and useful Improvements in Combined Recorders and Registers, of which the following is a specification.

This invention relates generally to combined recorders and registers, and more particularly to a combined recorder and register for use with fluid dispensing mechanism.

The object of the invention is to provide a device of this character which will make a permanent record of the fluid dispensed with respect to both the volume and frequency of the flow.

Another object is to provide a device of this character which will openly register the quantity of fluid dispensed by indicating the number of times the container into which the fluid is dispensed has been associated with the dispensing mechanism and which will secretly register the volume of flow.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is an elevational view, the cover of the casing being removed for the sake of illustration;

Fig. 2 is a plan view;

Fig. 3 is a detail view in front elevation of the combined recorder and register, the cover being removed and parts being shown in dotted lines for the sake of illustration;

Fig. 4 is a central horizontal transverse section through the combined recorder and register, on line 3—3 of Fig. 3, parts being shown in elevation for the sake of illustration;

Fig. 5 is a sectional view of the operating mechanism of the recorder, taken on line 5—5 of Fig. 3;

Fig. 6 is a detail view in longitudinal vertical section of the outlet pipe and recorder drive mechanism;

Fig. 7 is an enlarged detail view of a portion of the record card and stylus and its transfer mechanism in one position;

Fig. 8 is a similar view, showing the opposite position of the parts;

Fig. 9 is a detail perspective view of the stylus and its operating bar;

Fig. 10 is a detail perspective view of the operator of the resetting mechanism of the register and the punch mechanism of the recorder;

Fig. 11 is a detail view in front elevation of the signaling panel adapted to be placed on the gasolene dispensing mechanism; and Fig. 12 is a similar view of the panel adapted to be placed on the kerosene mechanism.

Referring to the drawings, it will be seen that the invention contemplates a combined register and recorder associated with a fluid dispensing mechanism such for instance as is commonly used in dispensing oil or the like.

This type of fluid dispensing mechanism includes an outlet pipe 10 at the outer end of which is fitted a faucet indicated generally at 11, of conventional construction. The faucet includes as usual a nozzle 12 and an operating handle 13 controlling the valve of the faucet. A suitable support preferably in the form of an integral hook 15 is provided to receive the container such as a cam into which the liquid is dispensed.

A casing 16 preferably of cylindrical construction is carried by the outlet pipe and serves to house the combined recorder and register. The casing is provided with an aperture or window 17 through which the indicia of the register is exhibited as will be hereinafter more fully described. The register proper is in general of conventional construction and embodies a plurality of parallel disks 18 of coincident axis being carried on a common shaft 19 and having on their periphery indicia 18ª adapted to be exhibited through the window 17.

The operating mechanism for the register consists of a lever 20 which is fulcrumed at 21 to the outlet pipe and which is curved around the nozzle so that its outer end is arranged to overlie the hook 15. This outer end is curved upwardly, as shown at 22, so as to retain the can or the like which is received thereby. On the sides thereof the portion 22 is provided with depending flanges 23 which embrace the hook 15 and constrain the lever 20 to vertical swing. A compression coil spring 24 is disposed between the under side 10 of the portion 22 and the hook 15 to normally maintain the lever spaced from the hook 22. A suitable recess 25 is provided in the hook 15 to receive the lower end of the coil spring and prevent displacement thereof. Adjacent the fulcrum the lever 20 is provided with an integral upstanding lug 26 to which the outer end 27 of the pawl 28 is pivotally connected. The pawl 28 coöperates with a ratchet 29 loose on the shaft 19 and carrying a second pawl 28ª operatively engaged with a second ratchet wheel 29ª fixed to the shaft 19. These constitute therewith the pawl and ratchet mechanism for actuating the disks of the register. A retractile spring 30 (see Fig. 3) has one end connected to the pawl 28 and the other end connected to the casing 16 to urge the pawl against the periphery of the ratchet 29. Suitable transfer mechanism of conventional construction is provided for transferring the motion of one disk to the adjacent disk of the higher order. The ratchet wheel 30 constitutes not only the drive for the disk of the register but it is also adapted to transmit the reverse motion to the disks and thus serves as a reset.

The recorder has its operating parts entirely housed within the casing 16 and the outlet pipe and serves to secretly record the volume of fluid dispensed and the frequency of the flow. For this purpose the outlet pipe is provided with depending arcuate webs 31 and 31ª defining a chamber 32 in which is operatively mounted the rotary fluid driven element 33 having its shaft 34 arranged transversely to the line of flow of the fluid and having radial vanes or blades 35 carried by the shaft. Thus any flow of the fluid through the outlet pipe imparts a proportional movement to the rotary element 33. The shaft 34 of the rotary element is extended at one end into the casing 16 and carries a drive pinion 36.

A countershaft 37 is rotatably journaled in suitable bearings provided therefor and is driven from the drive shaft by means of a driven pinion 36ª fixed to the countershaft and meshed with the drive pinion 36. A driving pinion 38 is fixed to the countershaft and transmits motion to an internal ring gear 39 loosely mounted on the drive shaft by means of a circular plate 39ª integral therewith or otherwise secured thereto. A record sheet 41, preferably in the form of a disk, is carried by the plate 39ª. Nuts or similar means 42 prevent endwise displacement of the plate 39ª and record sheet 41 carried thereby. The end of the casing adjacent the recorder is closed by a cover 43 which is locked in closed position to entirely conceal the recorder.

The record sheet or disk 41 is provided on its outer face with a plurality of circular series of units arranged concentrically thereof. Preferably the circular series of units adjacent the periphery of the disk range from 1 to 500 and record the frequency of flow and the volume up to 500 gallons. After this amount, the record is automatically transferred to the inner adjacent row where the operation is repeated and so on to the innermost row of the disk. In this embodiment of the invention there is provided only two rows, an inner circular series and an outer circular series.

The means for marking the disk to make the record of the volume and to punch the disk to record the frequency of the flow comprises a bar 45 having one end inturned, as at 46, and secured to the casing 16 and carrying at its outer end a rotatable disk 47. The disk 47 lies adjacent the record sheet and the contiguous face of the disk is provided with a plurality of styles, indicated at 48. There are two styles in this embodiment as there is a stylus for each series of units.

As shown in Fig. 7 the record sheet and stylus are arranged prior to the use of the disk, with the outer stylus disposed in operative marking position on the sheet and the inner stylus disposed on the record sheet intermediate the outer and inner indicia so as to be in inoperative position. As the fluid is dispensed it rotates the shaft 34 and the motion of the shaft through the gearing described is transmitted to the record sheet which rotates relative to the stylus which being carried by the stationary stylus bar is maintained at all times stationary. This relative motion produces a mark upon the record sheet. When the volume of the flow reaches a total of 500 gallons, the stylus strikes against the abutment 49 which rotates the disk 47 carrying the stylus throwing the outer stylus into inoperative position and the inner stylus into operative position on the inner circular series of indicia. The abutment 49 thus constitutes a transfer mechanism for automatically transferring the stylus.

In the dispensing of oil, it is the prevailing practice to deliver the same from the nozzle into a container, usually a five gallon can. A single sale, however, frequently comprises some multiple of five gallons so that it is necessary to repeatedly refill the five gallon can. In my invention for each time the can is placed upon the hook, filled and removed a registration of the operation is made by the register by virtue of the actuation of the same through the operating lever and pawl and ratchet mechanism, thus the number of cans filled for each sale is counted and possibility of mistake avoided. This is accomplished by virtue of the fact that the act of placing the pail on the hook 15 serves to actuate the register, advancing arm 20 once for each pail.

Upon the completion of each sale it is required that the register be reset to zero. For this purpose the shaft 19 is provided at one end with a clutch face or member 50 adapted to coöperate with a corresponding clutch face or member 51 formed on a short shaft 52 journaled in the cover of the casing and carrying exteriorly thereof a knob 53. The short shaft 52 is arranged in its bearings so as to be shifted longitudinally as well as to be capable of rotary motion. It is limited in its upward movement however by means of a collar 54 fixed to the shaft interiorly of the casing. The stylus bar 45 is arranged between the short shaft 52 and the register and in order that the clutch face or member of the short shaft may be coöperable with the clutch face, the stylus bar is provided with a central opening 55 through which the short shaft extends. The opening 54 permits of the free passage therethrough of the short shaft but it is not large enough to permit the collar 54 to pass therethrough. The arrangement is such that in order to engage the clutch faces 50 and 51, it is necessary to press the short shaft 52 inwardly and when this is done the collar 54 presses the stylus bar 45 inwardly. It is obvious that for each time the shaft is pressed inwardly to engage the clutch face and reset the register to zero it presses the stylus bar inwardly and causes the stylus points 48 to penetrate the record sheet and indicate the frequency of the flow. The short shaft 52 and its operating knob thus constitutes a common means for operating the resetting mechanism and for punching the record sheet.

In the use of the combined recorder and register it is obvious that the register is an aid to the driver in keeping an accurate account of the amount of oil or the like which is dispensed to each customer. The recorder is preferably unknown to the driver and is effectively concealed within the casing which apparently contains only the register. The record affords protection to the employer, in that it accurately checks the total amount of fluid dispensed and the amount dispensed at each sale, the protection afforded the employer being not only against dishonesty on the part of the driver but also protects his diligence and his honesty to the customers in that the punching of the card together with the concurrent record indicates the precise amount which has been disposed for each sale.

It is to be noted that, when desired, the signal panels disclosed in Figs. 11 and 12 may be used and associated with the window adjacent the register. The panel 60 adapted to be associated with the gasolene dispensing mechanism is shown in Fig. 11 and bears the indicia "Gasoline", designated at 61. This panel 60 is constructed of red colored glass and the indicia thereon is of contrasting color. The panels 62, adapted to be associated with the kerosene dispensing mechanism is constructed of clear glass, as shown in Fig. 12 and bears the indicia "Kerosene" thereon as designated at 63. The indicia "Kerosene" is of course of contrasting color. The panels 60 and 62 are each provided with a window, designated at 64, and 65, respectively. It is obvious that when the panel is associated with the retaining flanges of the casing 16, the window of the panel is alined with the window of the casing so that the indication of the register may be used with facility.

One object of this invention is to automatically register the correct number of tank wagon buckets, tank wagon cans, or other vessels, delivered by tank wagon, tank truck or other vehicles on which there is provision made for the delivery of gasolene, kerosene, and other classes of oils, or liquids, which has an outlet through faucets, such deliveries usually being made in five (5) gallon cans, or buckets, to all classes of trade, such as filling stations, garages, stores, factories and all classes of deliveries made by tank wagon or tank truck. This invention eliminates the possibility of errors in the counting of buckets delivered to party receiving the goods, as all buckets are automatically registered as bucket is lifted from faucet hook. This invention will eliminate losses to all parties concerned, as disputes often arise relative to miscounts, and often results in the loss of valuable accounts.

Another object of this invention is to eliminate the danger of tank drivers drawing "gasolene" when he thinks "kerosene" is being drawn. This is provided for by the "red" glass plate which fits over the top of case containing the register. The red glass plate has the word "Gasoline" written across the top, and the driver is constantly reminded of the fact that gasolene is contained in the tank or section of the tank, on which this plate appears. If driver makes a mistake of this kind he does so over the red signal, which he must see when he opens faucet preparatory to making delivery. Much property loss can be saved, and numerous damage suits, as well as loss of life due to such errors. Faucets containing gasolene are usually marked with red rags, which are attached to faucets, which have the word Gasoline printed thereon, while a great many faucets have no marker for gasolene. The glass plates which are used for kerosene faucets, or register, are clear in color and the word "Kerosene" appears in large letters across the plate. These plates are easily changed at such times as the contents of tank or section of tank is changed.

Another object of this invention is to make a complete record of all sales or deliveries, by the means of a meter located in the pipe-line, immediately back of faucet, which meter is connected with a shaft running to a plate in the back side of the register case, all of which is entirely concealed, and locked separately from the register. On the plate there is located a "secret card" which revolves from the force of kerosene, gasolene or other liquids running through the pipe line past the meter. The driver knows nothing of the entire attachment, except the bucket register, and apparently the entire attachment is for the purpose of registering the number of buckets drawn from the tank. The card case is locked, known only to the party in charge of the plant. The secret card can be made any size required and sealed to record any number of gallons desired. For the purpose of recording a one day out put of tank wagon or truck, the card is sealed to five hundred gallons (500) for each full revolution. There is the sharp pointed instrument or stylus attached at end of stationary bar, and the cards in making a revolution travel past the sharp pointed instrument. This card has, or can be made to have several lines of figures, ranging from the outer edge toward the center. When the card makes one full revolution, and passes from 495 mark to 500, or zero, the sharp pointed instrument is automatically thrown out of place and another pointed instrument comes in place immediately back of the one which was on the end of the shaft. This second point is so set that it travels the second ring of figures, and registers for the entire revolutions, etc.

As tank wagon drivers are under strict instructions to render tank wagon invoices promptly on delivery from tank, it will be necessary to turn the bucket register back to zero, if delivery is made by tank wagon buckets. To turn the register back to zero the driver will have to "push in" on wheel before rollers will turn back. The force of this action will cause the pointed instrument to punch the secret card at the exact gallonage which has passed through the meter on this delivery. Regardless of what the bucket register reads at end of delivery, the card will show the correct amount delivered to each customer when against the tank wagon invoices at the office at the end of the trip. Should driver deliver the entire load by hose, (not using buckets) the card will show when taken out of case the exact number of gallons passing through meter and stop on the correct figure. Should there be a leak through the faucet, the irregularity of the punches made on card will check past the gallon marks on a regular proportionate space until the tank is empty. There is a card for each faucet reading from left to right (facing the rear end of tank wagon or truck) and the card for the first faucet on the left will not seat on the plate of the second, other of the remaining faucets, which eliminates the possibility of getting the cards mixed at time the separate sections are checked by office. It is further the object of this feature of the invention to simplify the office work in checking up the daily sales and these cards serve as an accurate check in looking over deliveries at a future date, as any sale can be readily checked back on, even months after delivery is made. Even a short measure to a customer can be detected promptly after a day's work, if the cards are carefully checked against tank wagon invoices. Neither can there be any substitution of sales as the record will clearly show every detail when checked. These cards have a space for —— station name, tank wagon, or truck number, date, section number such as front, middle or rear, or Number 1—2—3, etc., also shows driver's name.

The sub-station of any oil company can send these cards in daily and the main office has the entire line on the driver. Any driver who tries to be dishonest, or negligent, can be immediately checked up, as there is absolutely no way in which he can work the invention to his own interest, so irregularities, whether they be for dishonest purposes or through negligence, can be detected promptly on checking him up at the end of his very first trip, which will save oil companies from being swindled out of their goods and also indicate to them immediately trying out of an imposition.

The features set forth in this invention are not only for uses on tank wagons and trucks but are to be used on stationary tanks or storages, and for heavy lubricating oils, and other liquids.

We claim:

1. In combination, a fluid dispensing mechanism including a support for the container into which the fluid is to be dispensed, a register, operating means for the register including a lever having a portion associated with the support, spring means for normally holding said lever arm spaced from said support, a pawl and ratchet mechanism actuated by said lever, a recorder associated with said register including a record sheet and a stylus adapted to mark the sheet to record the volume and to punch the sheet to record the frequency, a zero setting device for the register and common means to operate the stylus of the record to punch the sheet and actuate the zero setting device of the register.

2. In combination, a fluid dispensing mechanism including a support for the container into which the fluid is to be dispensed, a register, operating means for the register including a lever having a portion associated with the support, a pawl and ratchet mechanism actuated by said lever, a recorder associated with said register including a record sheet and a stylus adapted to mark the sheet to record the volume and to punch the sheet to record the frequency, a zero setting device for the register, and common means to operate the stylus of the record to punch the sheet and actuate the zero setting device of the register.

3. In combination, a fluid dispensing mechanism including a support for the container into which the fluid is to be dispensed, a register, operating means for the register associated with the support and actuated by the container received by the support, a recorder including a record sheet, and a stylus adapted to mark the sheet to record the volume and punch the sheet to record the frequency, a zero setting device for the register, and means to operate the marker to punch the sheet when the zero setting device is actuated.

4. In combination, fluid dispensing mechanism, a register, a zero setting device for the register; a recorder consisting of a record disk having an outer and inner circular series of units, means for rotating said record disk including a fluid driven element, a stationary stylus bar, a pivoted stylus disk carried by said bar, a pair of styles carried by said disk adapted to be selectively operated to mark and punch the units of the disks, and a stationary abutment for engaging the stylus and transferring it from the outer to the inner series of units; and means adapted to engage the stylus bar to cause the stylus to punch the disk when the zero setting device is actuated.

5. In combination, fluid dispensing mechanism; a register; a zero setting device for the register; a recorder consisting of a record disk having an outer and inner circular series of units, means for rotating said record disk including a fluid driven element, a stationary stylus bar, a pivoted stylus disk carried by said bar, a pair of styles carried by said disk adapted to be selectively operated to mark and punch the units of the disk and a stationary abutment for engaging the stylus and transferring it from the outer to the inner series of units, and means automatically operating the recorder when the zero setting device is actuated including a key for actuating the zero setting device having a shoulder engageable with the stylus bar.

6. In combination, a fluid dispensing mechanism, a register; and a recorder consisting of a rotatable disk, means for rotating said disk including a drive shaft, a fluid driven element for rotating said drive shaft and gearing for communicating the motion of said drive shaft to said record disk, and a stationary abutment adapted to mark said record disk to record the volume and to punch the disk to record the frequency; and means for actuating the register and for causing the stylus to punch the record disk.

7. In combination, a fluid dispensing mechanism including a pipe; a casing carried by said pipe; a register mounted within said casing; a recorder mounted within said casing and consisting of a record disk, means for rotating said record disk including a fluid driven element arranged in said pipe, a drive shaft carrying said fluid driven element and extending through said casing, a ring gear carrying said record disk, means for rotatably supporting said ring gear including an annular bushing; and gearing for driving said ring gear from said drive shaft, a stationary stylus bar and a stylus carried by said bar and engageable with the record disk to mark the same to record the volume and to punch the same to record the frequency of flow; and means for actuating the register and for causing the stylus to punch the record disk.

8. In combination, a fluid dispensing mechanism including a pipe; a casing carried by said pipe; a register arranged in said casing; a recorder arranged in said casing and consisting of a record disk, means for rotating said record disk including a fluid driven element located in said pipe, a stationary stylus bar having a central apertured enlargement, a stylus carried by the stylus bar and engagable with the record disk to mark the same to record the volume and to punch the same to record the frequency of flow; a reset for the register including a shaft having a clutch thereon; and common means for actuating the reset and for causing the stylus to punch the record sheet consisting of a short shaft carrying a clutch at its inner end adapted to engage the other clutch and having a shoulder engageable with the enlarged portion of the stylus bar.

9. In combination, a fluid dispensing mechanism and a recorder consisting of a rotatable disk having an outer circular series of units and an inner circular series of units, means for rotating said disk including a fluid driven element, a stationary stylus bar, a rotatable disk carried by said stylus bar, a pair of styles mounted on said disk, one of said styles being adapted to operatively engage one of the circular series of units while the other of said styles is disposed on the portion of the record disk intermediate said circular series of units and an abutment for engaging said stylus and transferring the same from operative engagement with one series of units to operative engagement with the other series of units.

10. In combination, a fluid dispensing mechanism and a recorder therefor consisting of a rotatable disk having an outer and an inner circular series of units, a stationary stylus bar, a rotatable disk carried by said stylus bar, a pair of styles carried by said rotatable disk adapted to be selectively engaged with the circular series of units and transfer mechanism for said stylus.

11. In combination, a fluid dispensing mechanism, a register, operating means for said register associated with said fluid dispensing mechanism, a recorder including a rotatable record disk, means for rotating said disk including a fluid driven element associated with said fluid dispensing mechanism, and a stylus adapted to mark said record disk to record the volume and to punch said disk to record the frequency of flow, and an operator for simultaneously resetting the register and for causing said stylus to punch said record disk.

12. In combination, a fluid dispensing mechanism, a casing supported by the fluid dispensing mechanism, a register arranged in said casing, operating means for said register associated with said fluid dispensing mechanism, a recorder concealed in said casing including a rotatable record disk, means for rotating said disk including a fluid driven element associated with said fluid dispensing mechanism, and a stylus adapted to mark said record disk to record the volume and to punch said disk to record the frequency of flow, and an operator for simultaneously resetting the register and for causing said stylus to punch said record disk.

13. In combination, a fluid dispensing mechanism, a register therefor and a recorder therefor consisting of a rotatable disk having an outer and an inner circular series of units, a stationary stylus bar, a rotatable disk carried by said stylus bar, a pair of styles carried by said rotatable disk adapted to be selectively engaged with the circular series of units and transfer mechanism for said stylus.

14. In combination, a fluid dispensing mechanism including an outlet pipe having a faucet provided with a hook for supporting the containers in which the fluid is dispensed, a register, operating means for the register including pawl and ratchet mechanism actuated by the placing of the container on the hook, a recorder, a fluid driven element located in the outlet pipe for actuating the recorder, and common means for actuating the reset of the register and affording an indication on the recorder.

15. In combination, a fluid dispensing mechanism including an outlet pipe having a faucet and supporting means for the containers into which the fluid is dispensed, a casing having a window, a register in said casing and visible through said window, operating means for the register actuated by the placing of the container on the supporting means, a recorder concealed within the casing and adapted to secretly check the register, and a fluid driven element located in the outlet pipe for actuating the recorder.

RALPH BLANCETT CORMANY.
ALBERT FRANKLIN HERRING.